G. H. CRASS.
AUTO. WHEEL.
APPLICATION FILED SEPT. 10, 1919.

1,375,830.   Patented Apr. 26, 1921.

G. H. Crass,
Inventor

UNITED STATES PATENT OFFICE.

GEORGE H. CRASS, OF ITHACA, NEW YORK, ASSIGNOR OF ONE-HALF TO JOHN SABIN, OF ITHACA, NEW YORK.

AUTO-WHEEL.

1,375,830.   Specification of Letters Patent.   Patented Apr. 26, 1921.

Application filed September 10, 1919. Serial No. 322,791.

*To all whom it may concern:*

Be it known that I, GEORGE H. CRASS, a citizen of the United States, residing at Ithaca, in the county of Tompkins and State of New York, have invented a new and useful Auto-Wheel, of which the following is a specification.

This invention relates to auto wheels, the object being to provide a wheel which is so constructed as to prevent skidding of the same and which will be prevented from becoming embedded in water-soaked roadways.

A further object of the invention is to provide a wheel which embodies a plurality of tread blocks mounted upon the periphery of the wheel which are so arranged as to insure the wheel against skidding and which blocks may be readily disengaged from the wheel for repairs and other purposes.

Still another object of this invention resides in the provision of a wheel wherein a plurality of blocks are secured to the periphery of the wheel, the blocks being held against undue vibration.

Another object is to provide a wheel for vehicles which consists of few parts, which is simple in construction, and which may be manufactured and placed on the market at a minimum cost.

With the above and other objects and advantages in mind, the invention consists of combinations of elements, constructions and arrangements, and general assemblage the details of which will be hereinafter referred to in the accompanying specification and recited in the subjoined claims, the invention being illustrated in the accompanying drawings, wherein:—

Figure 1:
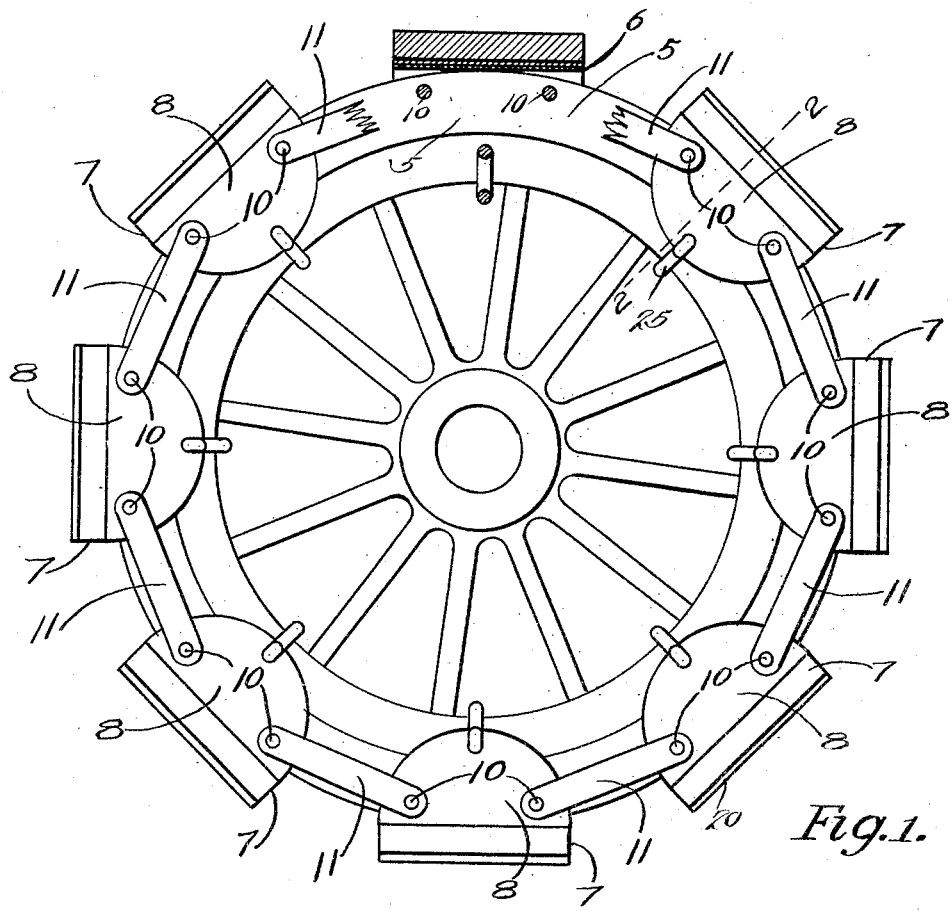
Figure 1 is a side elevation of a wheel embodying my invention, certain of the treads being shown in longitudinal cross section.
Figure 2:
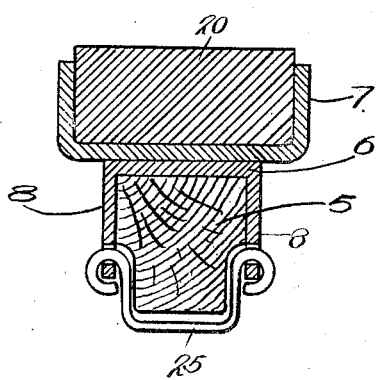
Fig. 2 is a transverse sectional view taken strictly on line 2—2 of Fig. 1 distant parts being omitted.

Referring to the drawing, the numeral 5 designates a felly of the usual construction upon which the tread members which constitute my improvement are mounted.

These tread members are arranged in spaced relation on the periphery of the wheel and each includes a plate 6 carrying a clip 7, elongated blocks 20 of rubber or other desirable material being mounted in the clip 7. Spaced parallel ears 8 project from the plate 6. Extending transversely through the ears 8 of each tread member and through the felly of the wheel are running pins 10 which hold the tread members parallel with the roadway.

Parallel links 11 are mounted at their ends on the pins 10 and connect the tread members. The ears 8 of each tread member are mounted by a U-shaped yoke 25. The links 11 distribute the strain among the various pins 10. If any of the pins 10 break, the yokes 25 will hold the device on the wheel.

What is claimed is:—

1. In a device of the class described, a rim; tread members mounted on the rim and comprising side ears; securing elements connecting the ears of each tread member with the felly; and links connecting the securing elements of each tread member with the securing elements of adjoining tread members.

2. A device of the class described, constructed as set forth in claim 1, and further characterized by the provision of yokes disposed transversely of the felly and connecting the ears of each tread member.

In testimony that I claim the foregoing as my own, I have hereto affixed my signature in the presence of two witnesses.

GEORGE H. CRASS.

Witnesses:
 BERT T. BAKER,
 LYMAN H. FERGUSON.